United States Patent Office 2,791,901
Patented May 14, 1957

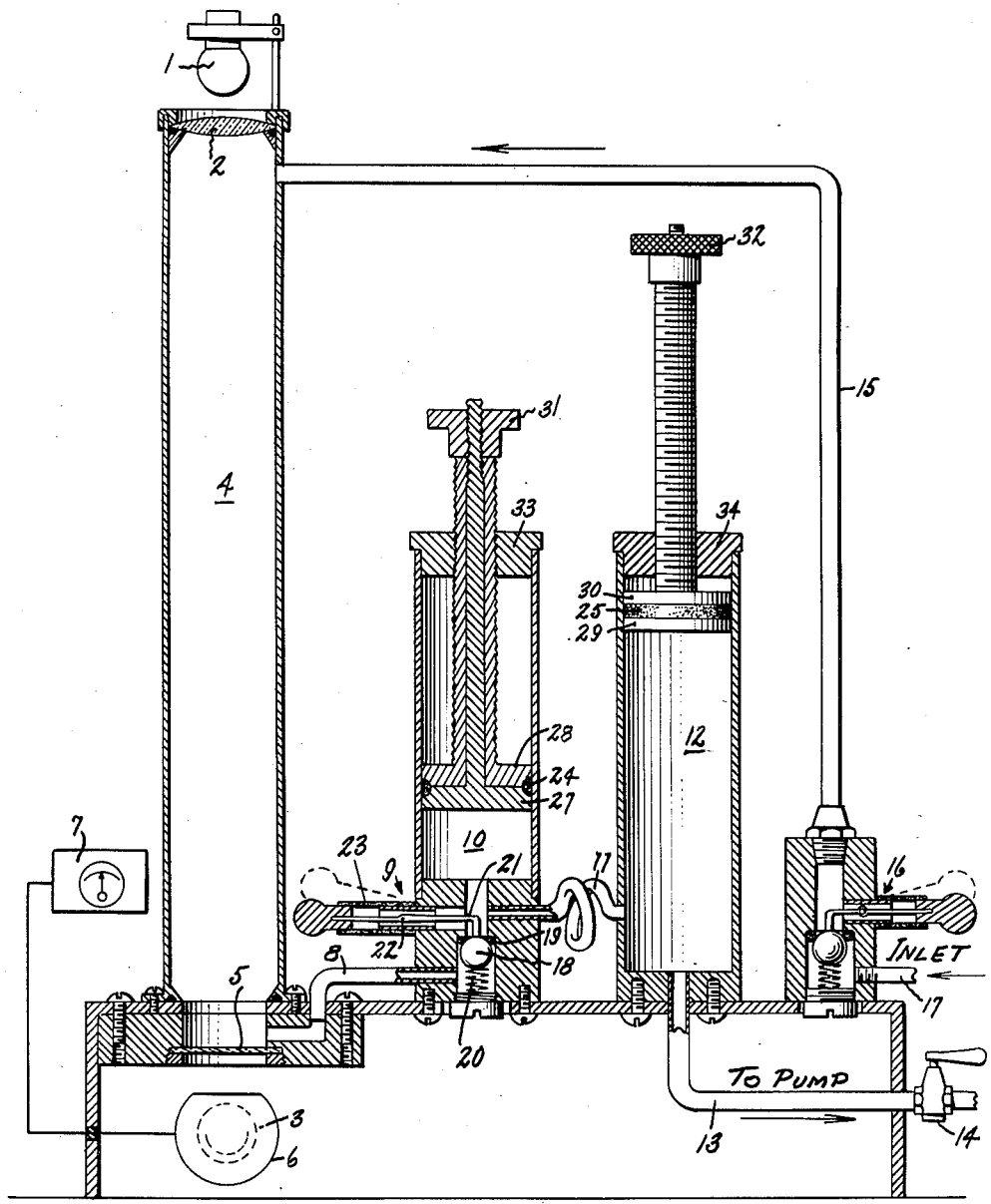

2,791,901

APPARATUS FOR MEASURING CONDENSATION NUCLEI

Theodore A. Rich, Schenectady, N. Y., assignor to General Electric Company, a corporation of New York Application May 24, 1954, Serial No. 431,706

11 Claims. (Cl. 73—17)

This invention relates to an apparatus for measuring condensation nuclei, and more particularly to such apparatus which can discriminate between various sizes of condensation nuclei.

Condensation nuclei is a generic name given to small airborne particles which serve as the nucleus on which water, for example, will condense as in a fog or cloud. One of the early types of condensation nuclei meters is known as the Aitken counter, and this was a predecessor of the Wilson cloud chamber now so widely used. In the Aitken meter, the air to be tested is introduced into a chamber lined with a wet blotter and then suddenly subjected to a known expansion. The adiabatic cooling of the air produces supersaturation, and the excess water deposits around the existing nuclei to form small water drops which are counted with a low power microscope. Aitken's work was done around 1870, and his device is still used as a comparison between different workers in this field. A discussion summarizing modern views on condensation nuclei can be found in the Compendium of Meterorology published in 1951 under the article by Christian Junge on page 182. The Aitken counter is a difficult instrument to use and the results obtained vary considerably. It is usually necessary to take the average of a number of readings to be at all certain of the result and few experimenters can obtain readings that are within 5 percent of the true value. Because of the time required, the device is most unsatisfactory for rapidly changing conditions.

One solution of the foregoing problems has been described by Nolan and Pollack in the Proceedings of the Royal Irish Academy, volume 51, section A. In their device, the air under measurement is brought into a closed chamber and the pressure increased by pumping in filtered air. Then the pressurized gas is allowed to come to atmospheric pressure by opening the valve. The resultant expansion produces a fog and the attenuation of a light by the fog is measured by means of a photocell and galvanometer. This device of Nolan's permits rapid and reproducible readings, but it has several serious shortcomings. It is well known that a certain degree of supersaturation is required to start the growth of a water drop on a particle of any given size. These relations are developed rather fully in an article by N. N. Das Gupta and S. K. Ghosh in Reviews of Modern Physics, volume 18, No. 2, April 1946. In nature, the nuclei in the air may range over a wide variety of sizes, and it is extremely desirable to be able to obtain an indication of the size distribution. It would appear from the literature that this could be done very simply by varying the amount of expansion of the gas. In practice, this does not work with either the Aitken or the Nolan type of counter. The difficulty is due to the fact that the expansion of the air is not complete before appreciable condensation takes place. In other words, the supersaturation (which determines the minimum size of nucleus to be read) depends upon the ratio of the water vapor pressure that exists to the saturated water vapor pressure at any given temperature. The expansions obtained in both the Nolan and Aitken types of counters take place rapidly enough so that the amount of heat picked up by the gas from the container is quite small and, therefore, the total amount of water available to form drops is substantially that obtained from the theory. On the other hand, the expected amount of supersaturation is not obtained because some of the water vapor is deposited on the larger drops before the complete temperature change is obtained. The features of my invention which avoid the difficulties now existent are described below.

It is one object of this invention to provide apparatus for obtaining a measure of the number of condensation nuclei within a gas sample.

It is another object of this invention to provide apparatus which will distinguish between condensation nuclei in accordance with their size in measuring their number.

Still another object of this invention is to provide a portable condensation nuclei meter which is easily operated, permits rapid and reproducible readings, and can distinguish between various sizes of condensation nuclei.

Other objects and advantages will appear as the description of the invention proceeds.

In accordance with the invention, a novel condensation nuclei meter is disclosed for distinguishing between various sizes of condensation nuclei. The novel meter comprises a first chamber adapted to hold a gas sample containing condensation nuclei under pressure, a second chamber connected to the first chamber by a fast operating valve, and a third chamber connected to the second chamber by a restricted passage. The second and third chambers are at lower pressures than the pressure in the first chamber, and when the valve is opened the gas sample in the first chamber rushes into the second chamber to equalize the pressures therebetween, thereby causing the gas sample to become supersaturated. The restricted passage then gradually permits the third chamber to receive the gas sample until the pressures in all three chambers have been equalized an appreciable time after supersaturation has occurred, permitting water vapor droplets to form around the condensation nuclei. Depending upon the degree of supersaturation, only a given size condensation nuclei will have water formed thereabout within the first chamber. Apparatus is also provided for measuring the number of such droplets in the first chamber. The volumes of the second and third chambers are adjustable in order that various degrees of supersaturation and condensation may be obtained.

By means of the apparatus, it becomes practical for the first time to distinguish between various sizes of condensation nuclei in measuring them; and, since the total volume of the chambers remains constant, a single scale can be used on the indicating meter and no conversion tables need be used.

The features of this invention which are believed to be novel and patentable are pointed out in the claims which form a part of this specification. For a better understanding of the invention, reference is made in the following description to the accompanying drawing, in which the sole figure shows a view partially in cross section of the novel meter of the invention, the indicating system being shown in block diagram form.

Referring now to the figure, there is shown an optical system comprising a light bulb 1 and a lens 2 which focuses the light on a phototube 3. The light traverses a cloud chamber 4, emerging through a transparent window 5. The phototube is supplied with a shield 6, and the phototube output is read in a conventional manner on an electrical instrument which is schematically represented by a box 7 with a meter face shown thereon. The chamber 4 is connected by a tube 8 through a valve 9 to a variable volume chamber 10. Chamber 10 is connected through a restricted passageway such as a capillary tube 11, or any other device which offers a substantial resistance to the flow of air, to a second variable volume chamber 12. An outlet for chamber 12 is provided by a tube 13 fitted with a valve 14 which goes to a vacuum pump, not shown. Cloud chamber 4 is connected by means of a tube 15 through a valve 16 to an inlet tube 17 to the air to be sampled.

The valves 9 and 16 were made especially for this invention and are identical. Valve 8 comprises a stainless steel ball bearing 18 which is pushed against a ring 19 by a spring 20, and this forms a very effective seal. To open the valve, an arm 21 is pivoted at 22; and by raising arm 21 the ball can be forced away from ring 19 to permit the free flow of air. In order to prevent contamination from the outside air or leakage, it is necessary to form a seal around the moving part. Normally, this is done by the use of flexible bellows, but it has been found that a piece of flexible tubing 23 can be slipped over the arm 21 and cover the pivot 22 to form an air tight flexible member.

The chambers 10 and 12 are sealed by rings 24 and 25, respectively, which are respectively compressed between a pair of members 27, 28 and a pair of members 29, 30, to be forced against the walls of the chambers 10 and 12. The members 28 and 30 are threaded externally but have an axial hole throughout their lengths through which members 27 and 29 respectively slide, these latter members being threaded at their one ends. A pair of nuts 31, 32 fit over the threaded ends of members 27, 29 and when tightened pull members 27, 28 together and members 29, 30 together, forcing rings 24 and 25 into intimate contact with the walls of chambers 10 and 12. Since both of these chambers are evacuated, there is a considerable force tending to pull this plunger down and reduce the volume. A pair of nuts 33, 34 which turn on parts 28, 30 are used to prevent any motion due to the vacuum in the chambers 10 or 12.

The operation of the invention now follows. Valves 9, 14, and 16 are opened and a sample of air is taken in through inlet tube 17. Then valve 9 is closed and chambers 10 and 12 are evacuated by a vacuum pump attached to tube 13. Then, sequentially, valves 14 and 16 are closed and photocell shield 6 is rotated to cut off the light from lamp 1, indicator 7 then being adjusted to read zero. The shield is then rotated to permit the light from 1 to fall on the phototube 3 and indicator 7 adjusted to read 100 percent. Then the valve 9 is opened suddenly, and the pressure in the chamber 4 falls very rapidly since the gas in chamber 4 must now occupy both chambers 4 and 10. Because of the restricted passageway 11, the vacuum in chamber 12 cannot rapidly reduce the pressure of chamber 4 but does, of course, cause a slow drop in pressure. The design is such that the equalization of pressure between chambers 4 and 10 takes place in a few milliseconds, whereas the equalization of chambers 4, 10 and 12 will require about a second. When valve 9 was opened, the sudden expansion of the gas in chamber 4 came to its final value before appreciable condensation could take place; and therefore, the supersaturation obtained in this first instant is that that would be calculated on the basis of an adiabatic expansion. The drops then start to form on all those nuclei that are bigger than a certain critical size. As these drops start to grow, they, of course, leave less water vapor available and the supersaturation falls rapidly. Then the additional expansion due to the chamber 12 comes into play and makes more water vapor available, but the rate at which this is done is so controlled that the supersaturation never exceeds that obtained in the first instant. At the end of a second then, there has been a change in temperature of the gas in chamber 4 which is a function of the change in volume due to both chambers 10 and 12. The supersaturation, however, is not a function of chamber 12 but only of chamber 10. The water drops in chamber 4 form a cloud and attenuate the light from 1, causing a reduction in the reading of the indicator which can now be calibrated in terms of the number of water drops.

The relation between the number of water drops and the attenuation produced is discussed by Nolan in the above mentioned reference. His discussion does not pretend to be a complete explanation, but he does discuss the main factors involved. For the purposes of this explanation, the exact relation between fog density and available water is immaterial; but in general, for a given amount of available water vapor, the attenuation varies very approximately as the cube root of the number of particles.

If another sample is taken into the cloud chamber 4 and the same operation previously described is repeated, but with different ratio between the chambers 10 and 12, but with the total volume of these chambers remaining unchanged, then the total amount of the expansion of chamber 4 is unchanged and the total amount of water vapor available is unchanged; and the calibration of the indicator is, therefore, also unchanged. On the other hand, if chamber 10 in the second case were much larger than in the first case, the supersaturation produced would be much larger in the second case. The number of nuclei read in the first case was all of those greater in diameter than a certain critical value. Similarly, the reading in the second case would be the number of particles larger than a new critical diameter which is, however, smaller than that of the first case. The difference between the two readings is then equal to the number of nuclei whose diameters lie between the smallest nuclei read in the first case and the smallest nuclei read in the second case. The result of the above described method and apparatus then is that one can take a series of readings with different initial supersaturations and thereby determine the distribution of particle sizes.

That this represents an apparatus for measuring condensation nuclei can be best illustrated by a comparison of results obtained with the Nolan or Aitken counters. The expansion in the Aitken counter is done by manually moving a piston to produce the required expansion. It is obviously impossible to move this piston manually fast enough to get an expansion in a few milliseconds. In modifying the Nolan counter, the size of the valve which releases the built-up pressure has been greatly increased, but in spite of this it has not been possible to obtain the theoretical supersaturation. This is most clearly demonstrated by trying to read the effect of gamma radiation on the Nolan counter. From the teachings of Das Gupta and others, a supersaturation of about 400 percent will produce a fog on ions; but even with expansion ratios that were considerably greater than that theoretically required to produce this supersaturation, it is not possible to observe any effect from radiation. On the other hand, the effect of radiation is very easily observed in a device constructed according to the present invention. In a room in which there were no small nuclei, a series of readings were taken with the present invention using a constant total volume with chambers 10 and 12 but varying the ratio of the volumes, starting with a small volume in chamber 10. As soon as the volume in chamber 10 exceeded a few percent of the volume of chamber 4, the readings obtained with still larger values of chamber 10 were unchanged even though the volume of chamber 12 was reduced substantially to zero. A small quantity of $SO_2$ was released in the room, and it is well known in the art that this gas under the influence of light is transformed to $SO_3$ which then picks up water to form $H_2SO_4$. In the process of the growth of the sulphuric acid droplets, they pass through a series of sizes, some of which must, of course, be very small. Under these conditions, the readings obtained with small values of chamber 10 and large values of chamber 12 were only a quarter as great as those obtained with a large volume in chamber 10 and a small volume in chamber 12.

With the previous types of condensation nuclei meters, if readings were attempted at low expansion ratios, there would be a considerable reduction in the amount of water vapor available; and the resulting fog or the size of droplets would be so small as to give considerable trouble in accurate measurement. By keeping the total volume change the same and still varying the super-saturation, then the fog produced always contains the same amount of water and is, therefore, always as easy to read. One other great practical advantage is that the indicator can be supplied with a single scale which is valid regardless of the size of particles being measured.

What I claim as new and desire to secure by Letters Patent of the United States is:

1. A condensation nuclei meter comprising chamber means adapted to hold under pressure a gas sample containing condensation nuclei, first means for rapidly reducing the pressure in said chamber to a first given value, second means for slowly reducing the pressure in said chamber still further to a second given value, and means for providing an indication of the density of the resulting fog within said chamber.

2. A condensation nuclei meter comprising first chamber means adapted to hold under pressure a gas sample containing condensation nuclei, second chamber means connected to said first chamber means by fast operating first valve means, said first valve means having a capacity such that upon operation it enables the pressure in said first chamber means to be rapidly reduced, third chamber means connected to said second chamber means by restricted passage means, and means for providing an indication of the density of the resulting fog within said first chamber means after said valve means has been operated and the pressures in all of said chamber means have been equalized.

3. A condensation nuclei meter according to claim 2, wherein said second and third chamber means have different given volumes.

4. A condensation nuclei meter according to claim 3, further including a pair of interchangeable means for changing the dimensions of said second and third chamber means so as to interchange their given volumes.

5. A condensation nuclei meter of claim 4, wherein said pair of interchangeable means comprise first and second plunger means respectively determining the volumes of the respective second and third chamber means.

6. A condensation nuclei meter according to claim 2, wherein said second and third chamber means have volumes which can be varied.

7. A condensation nuclei meter according to claim 6, wherein said second and third chamber means contain gas at a lower pressure than that of said first chamber means.

8. A condensation nuclei meter according to claim 7, further including a pair of interchangeable means for changing the dimensions of said second and third chamber means so as to interchange their given volumes.

9. A condensation nuclei meter according to claim 8, wherein said pair of interchangeable means comprise first and second plunger means respectively determining the volumes of the respective second and third chamber means.

10. A condensation nuclei meter according to claim 9, wherein said first chamber means has gas sample inlet means coupled thereto through second valve means, and said third chamber means has tube means coupled thereto through third valve means and adapted to be connected to a pump means.

11. A condensation nuclei meter according to claim 10, wherein said first valve means comprises spring biased ball means for sealing off said first and second chamber means from one another, and means for forcing said ball means against its spring when it is desired to interconnect said first and second chamber means.

References Cited in the file of this patent

UNITED STATES PATENTS

| | | |
|---|---|---|
| 2,281,418 | Deaton | Apr. 28, 1942 |
| 2,654,242 | Fallgatter | Oct. 6, 1953 |
| 2,676,266 | Cowan | Apr. 20, 1954 |